United States Patent [19]

Dennis

[11] Patent Number: 5,477,034
[45] Date of Patent: Dec. 19, 1995

[54] METHOD AND APPARATUS FOR BONDING PDC BLANKS

[75] Inventor: Thomas M. Dennis, Houston, Tex.

[73] Assignee: Dennis Tool Company, Houston, Tex.

[21] Appl. No.: 395,305

[22] Filed: Feb. 28, 1995

Related U.S. Application Data

[62] Division of Ser. No. 187,185, Jan. 25, 1994.

[51] Int. Cl.$^6$ .................................................. B23K 1/002
[52] U.S. Cl. ............................................ 219/615; 219/651
[58] Field of Search ............................... 228/42; 219/615, 219/651

[56] References Cited

U.S. PATENT DOCUMENTS

| | | | |
|---|---|---|---|
| 3,178,549 | 4/1965 | Stein | 219/615 X |
| 4,156,329 | 5/1979 | Daniels | 51/309 X |
| 4,225,322 | 9/1980 | Knemeyer | 228/222 X |
| 4,319,707 | 3/1982 | Knemeyer | 51/309 X |
| 4,527,998 | 7/1985 | Knemeyer | 51/309 |
| 4,772,294 | 9/1988 | Schroeder | 51/309 |

*Primary Examiner*—Kenneth J. Ramsey
*Attorney, Agent, or Firm*—Gunn & Associates

[57] ABSTRACT

The present system is directed to both a method and apparatus for manufacture of teeth for use in drill bits. The desired tooth is formed by a hard carbide, a protective disc placed on the end of the support, the joinder being accomplished by a braze metal layer. The process contemplates positioning the disc in a matching receptacle within the head of a molding apparatus wherein the head and cavity of the head are exposed to the terminus of several coolant flow lines through the head so that the disc is brought into contact with flowing coolant. The fluid coolant is delivered by a compressor at elevated pressure and is a flow of cooled gas after dehydration. Rapid flow of heat into cooled support at the base prevent deterioration of the diamond layer while allowing use of higher temperature braze metals.

14 Claims, 1 Drawing Sheet

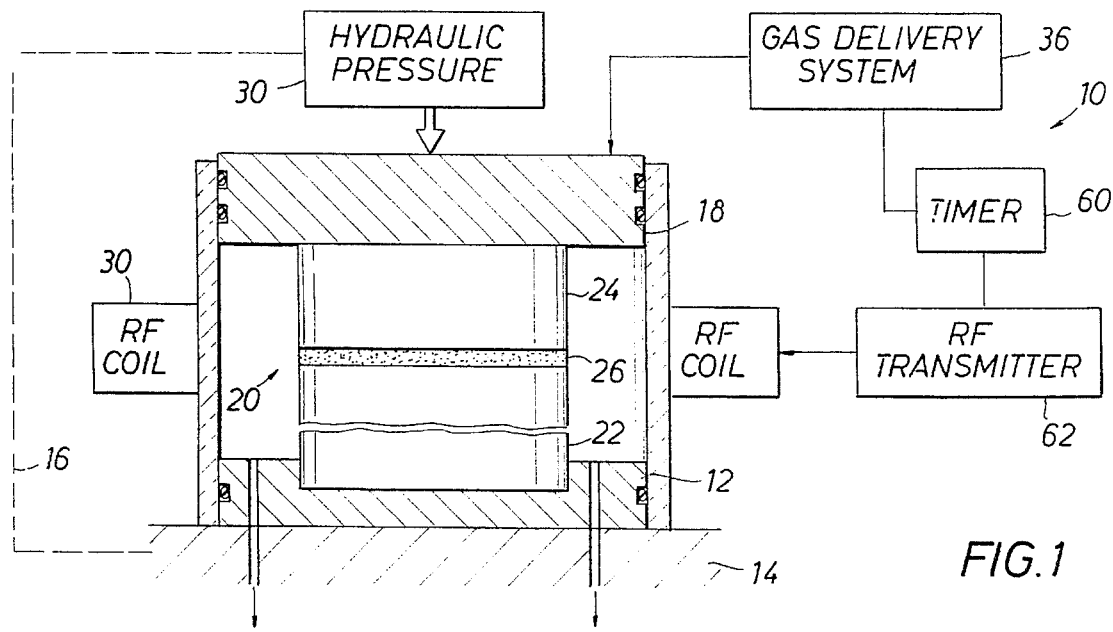
FIG.1
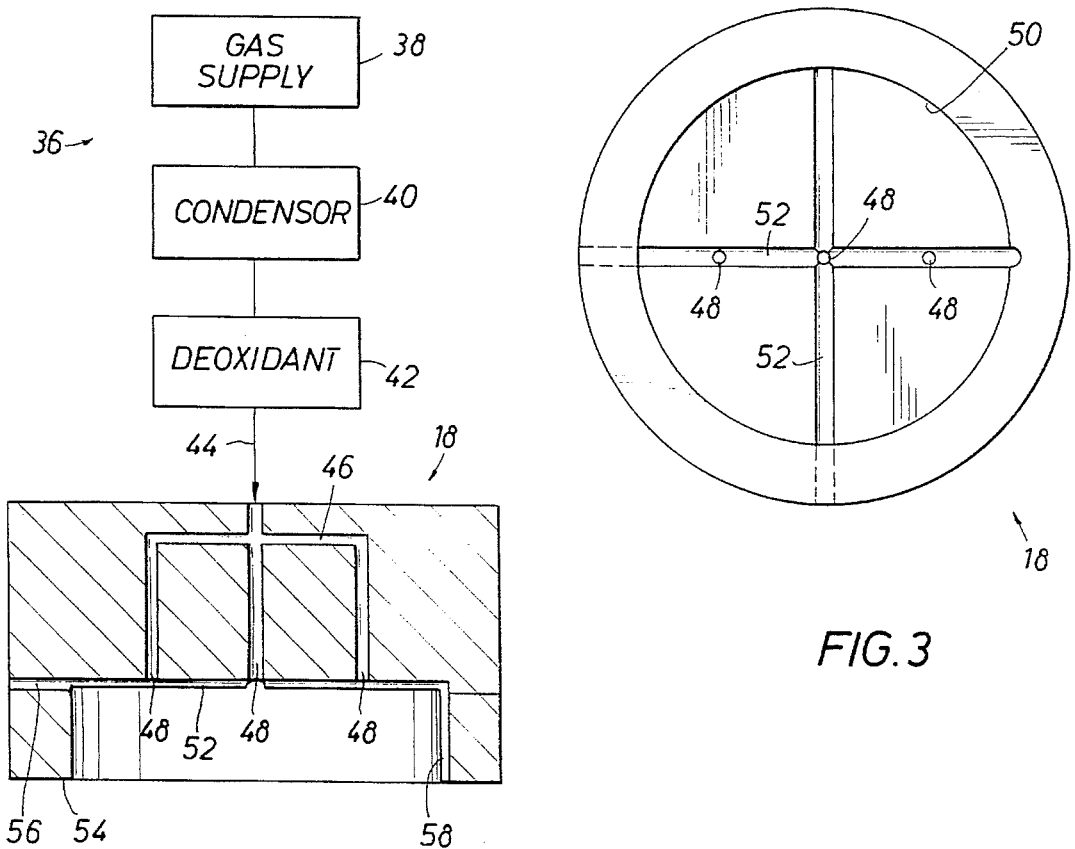
FIG.2
FIG.3

METHOD AND APPARATUS FOR BONDING PDC BLANKS

This is a Divisional of U.S. Patent application Ser. No. 08/187,185 filed Jan. 25, 1994.

BACKGROUND OF THE DISCLOSURE

In the fabrication of teeth for cutters and especially teeth to be used in drill bits for drilling oil wells, one desirable form is a composite tooth. It is formed of a bonded polycrystalline diamond compact (PDC) layer on a hard metal substrate serving as a support. The stud or substrate for the PDC is normally constructed of tungsten carbide metal which provides an unusually hard metal body. Tungsten carbide in particulate form must be molded and typically is supported in a matrix of some suitable base metal to form a support readily anchored as a stud. While the supportive stud can be shaped as an elongate cylindrical body, an end face is constructed at a right angle, or it may be a sloping face such as a chisel. As a generalization, tungsten carbide is the best and hence the preferred material for assuring that the support is able to withstand substantial impact in operation as a cutting tooth. It is possible to use alternative embodiments such as other types of carbides which are bonded into the support.

The present disclosure is directed to an apparatus and method for making a support with a polycrystalline diamond compact (PDC) layer on the end of it. While the preferred material is polycrystalline diamond compact, an alternative material is boron nitride. The first preferred material is polycrystalline diamond compact and boron nitride is second, and they are identified by the symbols PDC or BN respectively.

The process of joining the PDC to the support (primarily tungsten carbide or WC) involves brazing. One such procedure for this is in U.S. Pat. Nos. 4,319,707; 4,225,322; 4,772,294 and 4,527,998. They disclose a method and apparatus for forming a brazed diamond surface on the end of the support. One form of apparatus utilizes a water cooled system. One reason for this water cooling is the amount of heat liberated during the brazing operation. The large amount of heat liberated almost destroys the materials of the finished product. As will be understood, there are maximum limits on the temperature, and especially the temperature achieved by instantaneous melting of the braze material joining the PDC layer to the support. As set forth in U.S. Pat. No. 4,319,707, an RF source causes inductive heating. Heat is generated and flows readily into the WC component as well as the diamond component. So much heat is liberated that a water cooled system is used. As detailed especially in FIG. 4 of that disclosure, a water cooled coil must be used to limit the RF generated heat that is liberated in the work piece.

The present disclosure sets forth an enhanced manufacturing process and the related equipment for manufacture of a diamond coated member, namely, a PDC covered support. In this instance, the sandwiched components are first assembled by positioning the support and the PDC in a spaced relationship. The two blanks are separated by an adhesive metal layer. The metal layer is formed of a selected material which responds to brazing. The metal however is selected so that the maximum temperature required in brazing is less than the temperatures which destroy the WC, but it may be high enough to destroy the PDC components. In other words, temperature limits are imposed on the brazing process to avoid product damage and destruction. Without observation of practical temperature limits, the entire product can overheat, thereby destroying the integrity of the joined components by exceeding permitted temperature levels. For both the PDC and WC of the fabricated tooth, there are practical working maximum temperatures. The peak temperature actually achieved in the adhesive metal during the process determines the peak temperatures that are experienced in the PDC or in the support. Limiting the peak temperature is made somewhat more difficult because PDC is a very good heat conductor. In other words, any heat liberated in the braze material is conducted out of the metal material into the PDC blank and may damage the PDC blank if the peak temperature is excessive. To escape this, the present disclosure sets forth an apparatus which provides for cooling of the PDC support. It is not adequate merely to provide a heat sink on the PDC layer as in the prior art. Indeed, it also is not adequate merely to conduct water through a cooling jacket or other facility which is remote from the PDC layer. Rather, optimum cooling has to be against the support to assure that the joined PDC and support do not become sufficiently over stressed by exceeding the tolerated or permitted temperature.

The PDC layer is a very good heat conductor. The present disclosure contemplates cooling of the support rather than the PDC layer so that there is no need to transfer heat through PDC, a component which can be easily thermally damaged. By way of contrast, U.S. Pat. No. 4,319,707 shows a water cooling system in a supportive head. While that may do a very good job of keeping the head cooled, the heat transient that occurs with RF heating is brief, and is especially fast in light of the conductivity of the PDC material. Restated, the PDC material is readily able to conduct heat so damage from overheating is possible. The PDC disk comes in the form of a round, normally cylindrical button. The button is exposed directly to the cooling material flow. The detriment to this mode of manufacture is that the PDC disk must normally be contacted by a supportive head. Prior art systems such as shown in U.S. Pat. No. 4,225,322 require that the PDC disk be contacted with, resting on a ceramic support. The head has, in the preferred embodiment, a number of passages which carry a gas directly against the PDC disk is held in the head, being positioned in the head, as an insert. The disc does not need to be gripped or tightly held; rather, it needs to be located for exposure to the gas flow which provides a neutral or slightly reducing atmosphere to prevent PDC degradation. In the preferred embodiment, the coolant is a flow of chilled reducing or inert gas. More specifically, the gas is cooled or pressurized so that the heat content of the gas stream is markedly reduced, almost to zero.

Methods in the prior art devote substantial effort and attention to maintain contact between the PDC disc and the heat sink to thereby prevent damage to the PDC disc. Often however, this contact is not accomplished and damage still occurs because of shifting or warping of the PDC disc which often occurs in conjunction with irregular melting of the brazed layer (typically a foil) abutting the components.

The present system has a substantial advantage as a result of direct gas flow against the PDC disc and heat flow out of the disc. By operating in this fashion, the heat which is experienced at the PDC disc is carried away quickly so that damaging maximum (or peak) temperatures are not achieved. By distributing a number of passages or ports in the head, sufficient flow paths for directing the gas flow against the PDC disc are then provided so that heat is reduced before damage is inflicted on the disc. The heat is evenly removed at a controlled rate due to uninterrupted contact of the support and the metal members in contact with it.

In one aspect of the present disclosure, a press is set forth which assembles the unfinished components in a desired alignment. This involves a lower head formed of stainless steel which has a recess or cavity to support and hold upright the PDC support formed of WC or other hard materials. It is a relatively stable, fixed, preshaped structure which is able to maintain shape and hardness through the temperatures which are achieved in the present fabrication procedure. It is able to withstand temperatures in excess of about 1300° C. without damage. Moreover, the presently disclosed apparatus is used to align the lower head with the upper head so that the tooth part of WC or similar hard materials is able to support and receive a layer of adhesive material which is melted by induction heating through the use of an RF coil. While the heating interval is short because the mass of the adhesive material is relatively small, it is possible nevertheless that the temperature will spike high, creating a tremendous heat flux. The adhesive layer is clamped between the supportive hard metal insert below and the PDC disc above. While both are relatively good heat conductors, the PDC disc is a much better heat conductor. The present disclosure accommodates this aspect which enables excessive heat flow into the support, and is able to cool the PDC disc so that a proper bond is formed at one face of the PDC disc while the body of the PDC disk is cooled by flowing heat into the support and its contacted members thereby preventing damage by spiking to an excessive temperature. The present system thus provides a manufacturing system for fabrication of a brazed PDC disc on a support formed of hard metal, and also provides a procedure whereby such inserts can be fabricated.

An important aspect of the present disclosure is the ability of the system to fabricate numerous units without building up a residue of heat in the components of the equipment which require cooling for an interval thereafter. Rather, cooling is accomplished during each operative use of the equipment. The system is able to accomplish brazing with braze materials which do not cause excessive heating to make an adequately brazed joint, without excessive temperature spiking which would otherwise damage the sandwiched components forming the composite tooth or insert.

However the prior art as represented by U.S. Pat. No. 4,225,322 warns one not to exceed about 700° C. The reference points out that thermal degradation begins for the PDC layer at about that temperature. While this statement is technically correct, in two subsequent patents by the same inventors, they cite a diamond layer peak temperature of 840°–900° C. which is excessive and detrimental to the PDC. Reference is made specifically to U.S. Pat. Nos. 4,527,998 and also 4,772,294. It is noteworthy that the presently disclosed invention maintains the peak temperature of the PDC layer under a 700° C. at all times during the process. To the extent that higher temperatures exist, they occur in other components, not the PDC layer, and temperature damage is thereby avoided.

One aspect of the present disclosure is that the system is able to operate with a variety of sizes by utilization of different sized metal supports. This system also creates a reducing atmosphere at a braze joint area without the need to reduce or evacuate a large chamber.

This invention uses a blank which is 13.7 mm in diameter and 4.00mm thick.

General Electric uses a 2530NC diamond blank which is 13.3 mm in diameter and 3.53 mm thick. There is a difference of approximately 90° C. in the performance of the two sizes during fabrication. It has been discovered that there is a relationship between the thickness and diameter of the PDC disc. The discs are blanks preferably in the following relationship correlating thickness to diameter. The relationships are (given in mm):

| thickness | diameter |
|---|---|
| 4.0–5.0, | 7–11, |
| 4.0–5.5, | 11–15, |
| 5.0–9.0, and | 16–20, and |
| 8.0–10.0 | 20 and greater |

The table of correlated blank thickness to diameter given above operates in conjunction with the maximum temperature interposed on PDC bonding to thereby prevent high temperature spikes in the diamond layer. Substantial problems arise from the heating of the PDC blank. It functions as a simple bimetallic strip with a high residual stress stored as a result of quenching at high pressure and temperature. The residual stress is beneficial during rock cutting operations because the PDC component is maintained under compression during use. Taking into account the inherent thermal expansion of the underlying substrate (typically formed of tungsten carbide in a cobalt matrix), the resultant stresses from thermal expansion during this in conjunction with the compressive impact loading provides a PDC disc which is very long lasting in the rugged conditions in which it is normally used. Referring back to this table, if the disc is either too thin or the ambient operating temperature is excessively high, or an undesirable combination of both, cracks can be formed by catastrophic stress relief during operation. This occurs in the ongoing presence of high reactant ambient chemical exposure including those that enhance oxidation or other surface destructive mechanisms. Other mechanisms in addition to oxidation include delamination, graphitization, and stress cracking.

One aspect of adhering to the values set forth in the foregoing table is that the production scrap rate is markedly changed. While the scrap rate can be as much as ten percent in the practice of the process shown in the GE references mentioned above, and perhaps as low as five percent depending on operating skills, the process set forth in this disclosure has a scrap rate of only about one percent. Substantially all of that loss can be directly attributed to operator error. Moreover, the completed product is substantially more desirable in every regard.

BRIEF SUMMARY OF THE DISCLOSED APPARATUS

This disclosure sets forth a pressure operated press having upper and lower heads. The two heads are spaced from one another and are sized so that an assembled tooth is formed between the two heads. This comprises an upstanding tooth body of cylindrical shape (a stud or support) in the preferred embodiment, and an adhesive layer of braze material between the hard metal body and a PDC disc above it. In the preferred construction, the support is formed of hard metal material preferably including carbide, the preferred form being WC. The PDC disc is preferably formed as a right cylinder, having relatively parallel, polished upper and lower faces, and also having an external surface which is exposed for rapid cooling. The fabricating apparatus utilizes a lower head which is connected with a support frame. The frame extends upwardly to otherwise support a hydraulic or pneumatic press above, the press being constructed and arranged to apply pressure to an upper head so that the two heads are forced together with a controlled pressure. The applied pressure is controlled by variation of the hydraulic or pneumatic pressure for operation. The press utilizes the fixed frame to align the two heads, thereby providing a controlled axial loading on the partially assembled structure. A gas delivery system is connected to deliver a fluid flow through lines in the upper head. These lines are directed through various areas of the upper head so that a substantial flow is brought to the surface of the upper head. The surface encompasses the PDC disc, thereby flow occurs over the upper face or surface area of it.

The cooling system includes a tank of cooled compressed gas or a fluid pump which, in the preferred embodiment, is an gas compressor which delivers a substantial volume of gas through a variable passage. The gas is cooled by a condensor unit and moisture and heat are extracted from the gas.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 1 is a schematic diagram of the fabrication equipment of the present disclosure having upper and lower heads for grasping and holding the components of an assembled tooth for RF induction heating during fabrication which generates substantial quantities of heat;

FIG. 2 of the drawings is a sectional view through the upper head showing the gas delivery system connected with it, and also showing how gas is distributed; and FIG. 3 is a bottom view of the upper head showing a surrounding lip or shoulder which engages the PDC disc to hold that disc in position while also exposing the disc to a substantial flow of fluid for protecting the disc during the fabrication procedure.

DETAILED DESCRIPTION OF THE PREFERRED EMBODIMENT

Attention is now directed to FIG. 1 of the drawing where the numeral 10 identifies the fabrication equipment of the present disclosure. In FIG. 1, the fabrication equipment will be first described and components of a partially assembled cutting tooth will then be described. After that, the cooling system which is shown in FIG. 2 will be described. FIG. 3 is concerned with distribution of the gas which is bought into contact with the PDC disc as will be set forth in detail.

Continuing now with FIG. 1 of the drawings, the numeral 10 identifies the entire set of equipment. There is a lower head or cradle 12 connected with a frame member 14. The frame operates somewhat in the fashion of a C-clamp as indicated by the dotted line 16 which denotes the fact that the frame extends as an overhead structure to position opposing heads in a clamping relationship for fabrication of the tooth components into the completed product. The lower head or cradle 12 (made of non-magnetic stainless steel) is positioned opposite the upper head 18. For atmospheric isolation, a surrounding sleeve as large as the heads is included to confine gas discharge to the atmosphere. The sleeve is glass or some other transparent membrane. These two heads form the finished tooth which is identified generally by the numeral 20. In turn, the tooth 20 is formed of three individual components which are assembled in a sandwich and which are joined together in the fashion to be described. In the preferred embodiment, the lower most component of the assembled cutting tooth 20 is a stud or support which is identified by the numeral 22. It is preferably an elongate cylindrical body having planar upper and lower faces. It is preferably formed of tungsten carbide or some other hard carbide material. Since the tungsten carbide commonly has the form of particles, they are assembled together in a supportive matrix to assure that the stud has the cylindrical shape of the preferred form so that the finished product comprises a fully assembled tooth which can be anchored into a drill bit such as a cone in a rotary drill bit. To this end, the tooth which is derived from the stud or support 22 which has a preferred shape of a right cylinder with an exposed upper face. The top layer of the assembled tooth is identified by the numeral 24 which refers to the PDC disk. It is preferably about equal to the stud 22 in diameter. Typically, the support is much longer. Typically, the PDC disc is relatively thin. It has right cylinder construction in the normal course. The PDC disk is joined to the support by means of an adhesive layer 26. More specifically, the adhesive layer 26 is a layer of braze material. By definition, the braze material is melted so that the liquid metal flows into the intersticial crevices in the stud. Brazing is distinguished from welding in which the support is melted; in this particular instance, that does not occur. That will be explained in some detail below.

The adhesive material which is the braze metal is typically an alloy which has a specific melting temperature. By choice of the alloy constituents, the melting temperature can be varied substantially. Moreover by choice of the proper braze material, the surface tension can be sufficiently reduced so that the liquid formed by the melted braze material penetrates the support 22 to thereby improve the grasp accomplished in the brazing process. The bond is dependent on the penetration and the ability of the melted braze material to resist shearing stresses once the braze step has been accomplished. As will be noted in FIG. 1 of the drawing, the dimensions of the tooth 20 are exaggerated to show the several components. Thus, the support of right cylinder construction is illustrated locked in the head 12. It is locked because it is received in a cavity which is sized to hold the metal support. A snug fit is not required; a fit which permits easy finger engagement and removal of the support will be sufficient. As noted above, the PDC disc 24 is captured in the head 18. The head grasps the upper face of the disc 24. It is brought close to or into intimate contact with the top face of the disc. The disc is preferably fabricated with upper and lower faces which are planar and parallel. The two faces of the disc define a right cylinder construction in the preferred form. The bottom most face of the PDC disc 24 is pressed against the adhesive or braze material.

The braze material of the preferred embodiment is chosen to melt at a specified temperature which keeps the PDC layer temperature below about 650° to 700° C. In the choice of the alloy constituents in the braze material, it is preferable that the braze melting temperature not exceed the temperature at which damage may occur. This in turn relates to the joined PDC and support materials and the bonding capacity of the braze material when it is melted. Melting of the braze material is accomplished in this apparatus 10 by a circular RF coil 30 which encircles the braze alloy layer 26. The braze alloy layer 26 is located at a point so that magnetic field is focused on the braze material. The RF signal is applied to the coil 30, thereby creating current flow in the braze material 26 to achieve melting. More importantly, when melting occurs, the braze material adheres to the adjacent components. It will penetrate on melting into the intersticial areas of the support 22 and likewise adheres to the lower surface of the PDC disc 24. The adherence preferably takes advantage of a high temperature, high strength brazing metal which melts at the selected temperature below which degradation of the PDC disc might otherwise occur. Treating the degradation temperature as about 800° C., the alloy controllably melts at a temperature close to that level. While it is possible that spot temperatures greater than that might exist, the present disclosure shows how cooling is accomplished so that PDC damage does not occur as a result of heating.

The coil 30 is located so that it directs RF energy into the braze material 26. The braze alloy is melted so that adherence occurs. Adherence is initially set up by providing a modest force on the head 18. A hydraulically or pneumatically powered press 30 forces the upper head 18 toward the lower head or cradle 12. It is not necessary to provide substantial load on the unfinished tooth. Rather, the heads function as a clamp, thereby holding the components together with a minimum of drift or movement. Joinder is accomplished at a fixed force applied compressively between the two heads, and that force does not exceed a force of about 50 psi. The preferred range is from about 25 to 75 psi. If the force is excessively small, the components might be free to move during bonding. If the force is excessively high, the braze material may be squeezed from between the facing cylindrical members when it is melted.

FIG. 1 additionally shows an important aspect of the present disclosure which is the gas flow system 36. The system 36 delivers a flow of gas into the upper head 18 to be described. FIG. 2 of the drawings shows the gas delivery system 36 to comprise a gas supply compressor 38, a condenser unit 40 and a deoxidant treatment 42. These are serially connected to condition the gas delivered by a pressure source 38. More specifically, the gas delivery unit is provided with the gas flow to remove a substantial amount of heat. In one aspect, a refrigeration air conditioning system is normally sufficient as the source. After the air has been compressed, an increase in the ambient gas temperature occurs as a result of the compression. After compression, the gas is delivered through the condenser unit and the gas temperature is substantially cooled. With cooling, there is a concomitant reduction in water in the gas flow as denoted by reduced humidity. The apparatus thus cools the gas and then delivers it for deoxidant treatment.

The numeral 44 identifies the gas flow lines which then deliver the gas to the upper head 18. It is shown in sectional view in FIG. 2 of the drawings. The line 44 extends to a laterally directed internal flow line 46. Several downwardly directed passages 48, not much larger than a pin hole, extend to the bottom face. A cavity is formed on the bottom face of the upper head 18 as best shown in FIG. 3 of the drawings. The cavity 50 is sized to fit around the PDC disc without holding it in a tight grip. Across the face of the cavity as shown in the bottom view of FIG. 3, there are several grooves 52 formed where one side of the groove is open to thereby contact the PDC disc with the flowing gas. There are numerous passages 48 which deliver this flow of gas downwardly into the lateral grooves 52. These grooves extend across the face of the cavity as illustrated in FIG. 3 of the drawings. One important aspect of the present disclosure is the incorporation of the surrounding lip 54 which is below the cavity 50. The lip 54 reaches fully around the PDC disc to hold it in a registered position. The groove 52 across the face 50 connects with a laterally extending outlet or vent passage 56 which extends through the shoulder to the exterior. Alternately, at the opposite end of the grooves 52, there is an additional shoulder supported outlet groove 58. It extends around the edge of the disc 24. As will be understood, the number of grooves 52 can be varied as illustrated in FIG. 3 of the drawings. As further illustrated, there are at least several vertical fluid flow passages 48 to deliver the flowing gas into contact with the face of the PDC disc.

In operation, the disclosed apparatus functions in the following manner. The components shown in FIG. 1 of the drawing are assembled in the three component sandwich. They can be held in a finger tight relationship without slipping. They are assembled between the two heads which are closed toward each other prior to operation. Once the three components 22, 24 and 26 are assembled as noted, the next step is to apply pressure through the hydraulic or pneumatic press 30. As noted before, the pressure is preferably in the range of about 25 to 75 psi. Pressure must take into account the actual cross-sectional area of the support 22. In ordinary cases, and indeed in practically every case, the disc 24 is the same diameter as the support 22. Ordinarily, nothing is gained by making them of different diameter. In any case, in this state of affairs, the hydraulic press is operated to assure the requisite pressure applied between the two heads to hold the components together.

In this condition, the equipment is ready to operate for brazing. Brazing is accomplished by applying a flow of RF current to the coil 30 of requisite amplitude for a requisite interval. Heating is accomplished in only a few seconds. Heating is accompanied by melting of the braze material 26 which then forms a bond with the PDC disc above and the support below. Once the bond is accomplished, the tooth is assembled and is then ready to be retrieved. While the bond is formed very quickly and cooling is accomplished quickly, one important aspect of the present system prevents damage which would otherwise occur from excessive heating. As heat is liberated in the metal alloy material and as the temperature spikes rapidly upwardly, cooling is nevertheless accomplished at the PCD disc by means of the direct contact with the gas flow. When gas flow contact occurs, there is heat transfer into the gas stream which discharges under pressure through the outlets shown in FIG. 3. Venting is accomplished by a discharge of heated gases after having absorbed heat from the PCD disc. This is one intended purpose of this construction. Also, the gas stream is inert or reducing gases to thereby prevent oxidation.

As a generalization, the speed with which the braze material is melted is dependent on the mass of the braze material, the focus of the coil which directs RF energy into the braze material and the field strength. Also, the energy liberated is proportional to the duration. This assumes a fixed intensity signal transmitted from the RF coil into the braze metal. The braze material originally is at ambient temperature. It is heated in a few seconds to the elevated maximum temperature, and is heated so rapidly that the temperature increases in a substantially linear fashion to the maximum temperature. As rapidly as the braze metal is heated, there is heat transfer immediately from the braze metal into the PDC disc. The PDC disc is therefore at risk beginning immediately with heating of the braze metal, and, for that reason, it is necessary to immediately cool the PDC disc. The heat transferred from the brazed metal impinges on the PDC disc, and is removed from it by the cooling fluid provided in accordance with this process. The relatively short interval during which brazing occurs in this process is a significant reason why a water cooled head is less than effective. After all, the interval during which this process occurs is so short relative to the water cooled head apparatus.

One important aspect of the present disclosure is that the support beneath the PDC disc is used to draw heat away from the brazed junction. At the instant of brazing, there is a peak temperature increase which carries the temperature to some specified maximum value greater than 800° C. for a few seconds in the vicinity of the braze lines. As this occurs, heat is transferred from the PDC into the material for the two supports.

One important aspect of this system is that the mass which makes up the support 22 draws heat away from the PDC and the braze material layer 26. Recall again that FIG. 1 shows this layer 26 having exaggerated thickness. In reality, it is relatively thin, and forms a layer of melted metal very rapidly. With this buildup of heat, substantial heat is transferred into the body of the support 22, recalling especially that the support is a relatively large elongate cylindrical member. The volume of this support is greater than the volume of the PDC layer by several fold. It can easily be five to twenty times greater in volume. The heat transfer that directs heat away from the adhesive layer 26 takes advantage of the bulk or size of the body. More heat can be tolerated in this region. Moreover, heat transfer from the adhesive layer 26 into the support 22 is accomplished with less thermal reflectivity at the interface. In other words, both the brazed material and the support are formed of metal. In summary, a substantial transfer of heat is utilized to reduce the spike of the temperature as it is instantly melted by the RF radio frequency energy applied for that purpose. The heat spike is thereby diverted into the support away from the diamond layer in the PDC.

Direct cooling of the rapidly heated PDC disc and assembled tool is one of the advantages of the present system. Variations in scale of this system can be obtained by changing the flow patterns of the coolant; for instance, the passages can be made larger, and more cooled gas gas can be delivered. Substantial initial cooling can be obtained by timing the delivery of the cooling system so that the coolant is delivered a fracture of a second before the RF energy is delivered. To accomplish this, one helpful accessory for the present system is required, and that is a timing switch. In FIG. 1 of the drawings, a timing switch 60 is connected so that the cooling system is initiated in operation at an earlier moment. The timing switch 60 is shown in the drawings connected with an RF transmitter 62 which is then input to the RF coil. In the preferred embodiment, the RF transmitter 62 is an oscillator operated at the requisite frequency. The output is provided to a power amplifier which is input to the RF coil. As a generalization, the power can be varied over a wide range to assure that the power applied to the braze metal is adequate. In the modification just mentioned, the timer 60 triggers the cooling system to provide coolant flow a fraction of a second in advance of operation of the RF transmitter 62. This preflow also purges oxygen from the system to leave a neutral or reducing atmosphere in the braze joint area.

One important aspect of the present disclosure is directed to the ratio of sizes which are evident in the below listed table where the PDC disc diameter is related to the thickness of the disc. The relationship, measured in mm for the two dimensions of the disc, is given below:

| thickness | diameter |
|---|---|
| 4.0–5.0, | 7–11, |
| 4.0–5.5, | 11–15, |
| 5.0–9.0, and | 16–20, and |
| 8.0–10.0 | 20 and greater |

One advantage of utilizing a disc having dimensions within the above specified ranges is that the residual stress in the PDC disc is used to properly precondition the disc to the typical loading which occurs during use. This construction enables the disc to be pre-stressed, thereby resisting the stress formed on impact during rock cutting operations. More specifically, the impact is accompanied by an instantaneous shock wave of stress which is formed in the disc and transferred along the tooth into the body of the drill bit. This construction is advantageous because it accommodates a greater range of dynamic stresses in the system. Moreover, the advantage is particularly accentuated when the disc thickness is correlated to the disc diameter in the relationships set forth in the attached table. This is true with regard to the assembled device made in accordance with the procedures of the present disclosure or even in the instance where the disc is formed in methods taught heretofore for the fabrication of PDC clad teeth.

While the foregoing is directed to the preferred embodiment, the scope is determined by the claims which follows.

What is claimed is:

1. An improved brazing apparatus for bonding different materials together to form a cutting tooth wherein one of the materials is selected from boron nitride or PDC in the form of a disc which is brazed to a supportive tooth body formed of a hard carbide metal, the apparatus including a frame having a pair of opposing supportive heads, and the apparatus further comprises;

a) a press means for moving a pair of opposing heads to a spaced relationship so that the disc is held in one of said heads in a cavity therein aligned with the opposite of said support head for bonding the disc to a tooth body;

b) RF induction heater for heating a braze metal layer between said disc and said tooth body; and c) a gas flow supply means for providing a flow of inert or reducing gases through a passage to deliver flowing gases into intimate contact with the exposed face of said disc during heating.

2. The apparatus of claim 1 wherein said head includes passages formed therein to direct gas flow through said passages into contact with said disc at an exposed face and sides thereof, and said head encircles said disc.

3. The apparatus of claim 1 wherein said disc is a circular disc having a planar face on the top thereof; and said head incorporates a plurality of passages therethrough deployed at said cavity therein for snuggly fitting around said circular disc, and further wherein said passages are connected with the gas flow supply means.

4. The apparatus of claim 3 wherein said head holding said disc includes a central disc conformed cavity and a surrounding lip to clamp a disc therein.

5. The apparatus of claim 4 wherein the disc is joined to a hard metal support in which the disc has a thickness in the range of 8.0–10.0 mm and diameter of at least 20 mm.

6. The apparatus of claim 4 wherein the disc diameter relates to thickness in mm given by:

| thickness | diameter |
|---|---|
| 4.0–5.0, | 7–11, |
| 4.0–5.5, and | 11–15, and |
| 6.0–9.0 | 16–20 |

7. The apparatus of claim 1 wherein the disc is a PDC disc joined to a support made of hard metal and having a cylindrical construction; and wherein the PDC disc is brazed thereto, said disc having a thickness to diameter relationship in mm given by:

| thickness | diameter |
|---|---|
| 4.0–5.0, | 7–11, |
| 4.0–5.5, and | 11–15, and |
| 6.0–9.0 | 16–20 |

8. The apparatus of claim 1 wherein the gas flows through a cooling device.

9. The apparatus of claim 1 wherein said disc is grasped by said head having fluid flow passages directing gas flow onto said disc.

10. The apparatus of claim 1 wherein said head for holding said disc is formed with passages directing gas flow through said passages into contact with said disc on the top face thereof.

11. The apparatus of claim 10 wherein reducing or inert gas flow is pumped into said passages, and said support has a specified mass of metal so that cooling is achieved by directing heat from the braze metal into the metal support.

12. The apparatus of claim 10 wherein said support is held in a head in a cradling arrangement wherein said head is constructed of heat conducting steel, brass or cemented carbide.

13. The apparatus of claim 1 wherein said head includes passages to enable direct gas flow through said passages into contact with said disc at an exposed face and sides thereof.

14. The apparatus of claim 13 wherein said disc is formed as a circular disc having a planar face on the top thereof; and said head is constructed with a plurality of passages therethrough deployed at a cavity therein for snuggly fitting around said circular disc, and further connecting said passages with the gas flow supply means.

* * * * *